(12) United States Patent
Park et al.

(10) Patent No.: US 12,480,754 B2
(45) Date of Patent: Nov. 25, 2025

(54) INSPECTION DEVICE FOR COOLING PLATE

(71) Applicant: DO LIM INDUSTRY CO., LTD., Ulsan (KR)

(72) Inventors: Sung Gye Park, Gyeonggi-do (KR); Sung Joo Kim, Ulsan (KR); Ki Young Kim, Ulsan (KR); Tae Moon Kwon, Ulsan (KR); Sang Do Lee, Ulsan (KR)

(73) Assignee: DO LIM INDUSTRY CO., LTD., Ulsan (KR)

( * ) Notice: Subject to any disclaimer, the term of this patent is extended or adjusted under 35 U.S.C. 154(b) by 373 days.

(21) Appl. No.: 18/352,535

(22) Filed: Jul. 14, 2023

(65) Prior Publication Data

US 2024/0019236 A1 Jan. 18, 2024

(30) Foreign Application Priority Data

Jul. 15, 2022 (KR) .......................... 10-2022-0087439

(51) Int. Cl.
*G01B 3/22* (2006.01)
*G01B 5/28* (2006.01)

(52) U.S. Cl.
CPC .................. *G01B 3/22* (2013.01); *G01B 5/28* (2013.01)

(58) Field of Classification Search
CPC .................................... G01B 3/22; G01B 5/28
USPC ................................................ 33/1 BB, 532
See application file for complete search history.

(56) References Cited

U.S. PATENT DOCUMENTS

| | | | | |
|---|---|---|---|---|
| 3,793,738 A | * | 2/1974 | Blakey | G01B 3/00 33/501 |
| 3,846,105 A | * | 11/1974 | Petrella et al. | B29C 53/04 33/1 BB |
| 4,242,803 A | * | 1/1981 | Dory | G01B 5/207 33/549 |
| 4,662,075 A | * | 5/1987 | Mastel | A61F 9/0133 33/201 |
| 5,026,033 A | * | 6/1991 | Roxy | B23Q 3/103 269/45 |
| 5,048,195 A | * | 9/1991 | Leonov | G01B 5/24 33/645 |
| 5,193,286 A | * | 3/1993 | Collier | G01B 21/20 33/DIG. 2 |

(Continued)

FOREIGN PATENT DOCUMENTS

KR 10-1986238 B1 5/2019

*Primary Examiner* — George B Bennett
(74) *Attorney, Agent, or Firm* — Tarolli, Sundheim, Covell & Tummino LLP

(57) ABSTRACT

Proposed is an inspection device for a cooling plate capable of accurately inspecting cooling plates to reduce cooling plate defect rate. The device includes an inspection table including a base on which a cooling plate is seated, a support block located on each side of the cooling plate, a guide block, and a plurality of height blocks supporting a lower surface of a base plate, a clamp provided on the base and pressing an upper surface of the base plate, a plurality of gauge jigs and a plurality of gauge grooves, a first measurement unit measuring a distance at which the end of an extension plate is spaced from a bending plate, and a second measurement unit measuring a distance at which the end of the bending plate is spaced apart from the end of the base plate in the width direction, and measuring the flatness of the base plate.

5 Claims, 11 Drawing Sheets

(56) References Cited

U.S. PATENT DOCUMENTS

| | | | | |
|---|---|---|---|---|
| 5,421,099 A * | 6/1995 | Hasco | ............ | B23Q 16/00 |
| | | | | 33/573 |
| 5,481,811 A * | 1/1996 | Smith | ............ | B25B 31/005 |
| | | | | 33/573 |
| 5,909,940 A * | 6/1999 | Baldock | .......... | G01B 5/207 |
| | | | | 33/608 |
| 6,082,011 A * | 7/2000 | Phillips, III | ...... | G01B 11/275 |
| | | | | 33/203.16 |
| 6,941,670 B1 * | 9/2005 | Mori | ............ | A63B 60/42 |
| | | | | 33/508 |
| 8,650,768 B2 * | 2/2014 | Fan | ............ | G01B 21/20 |
| | | | | 33/1 BB |
| 11,692,801 B2 * | 7/2023 | Verduin | ............ | G01B 3/002 |
| | | | | 33/567.1 |
| 11,774,227 B2 * | 10/2023 | Kiyotani | ............ | G01B 5/0004 |
| | | | | 33/502 |
| 2013/0031796 A1 * | 2/2013 | Pipp | ............ | G01B 5/025 |
| | | | | 33/555.1 |
| 2018/0172435 A1 * | 6/2018 | Robson | ............ | G01B 21/20 |
| 2021/0122062 A1 * | 4/2021 | Kllibarda | ............ | B25J 9/0093 |

* cited by examiner

[FIG. 1]
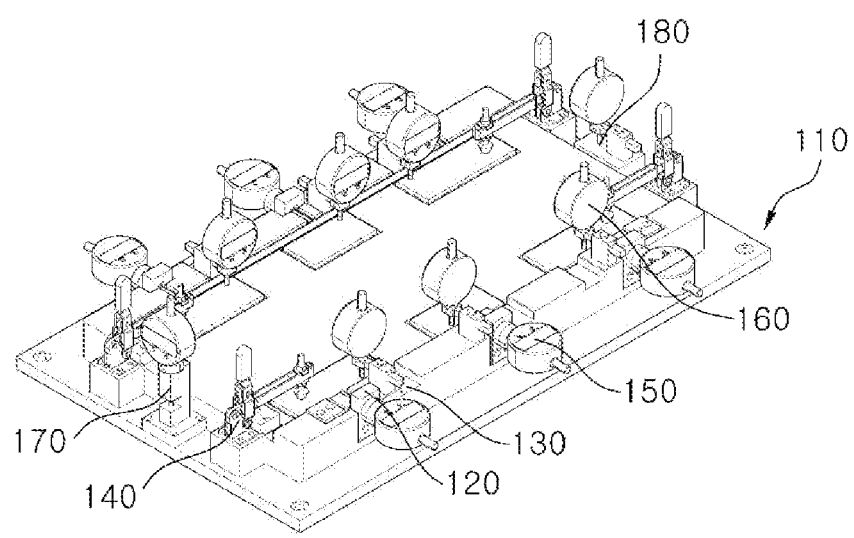

[FIG. 2]
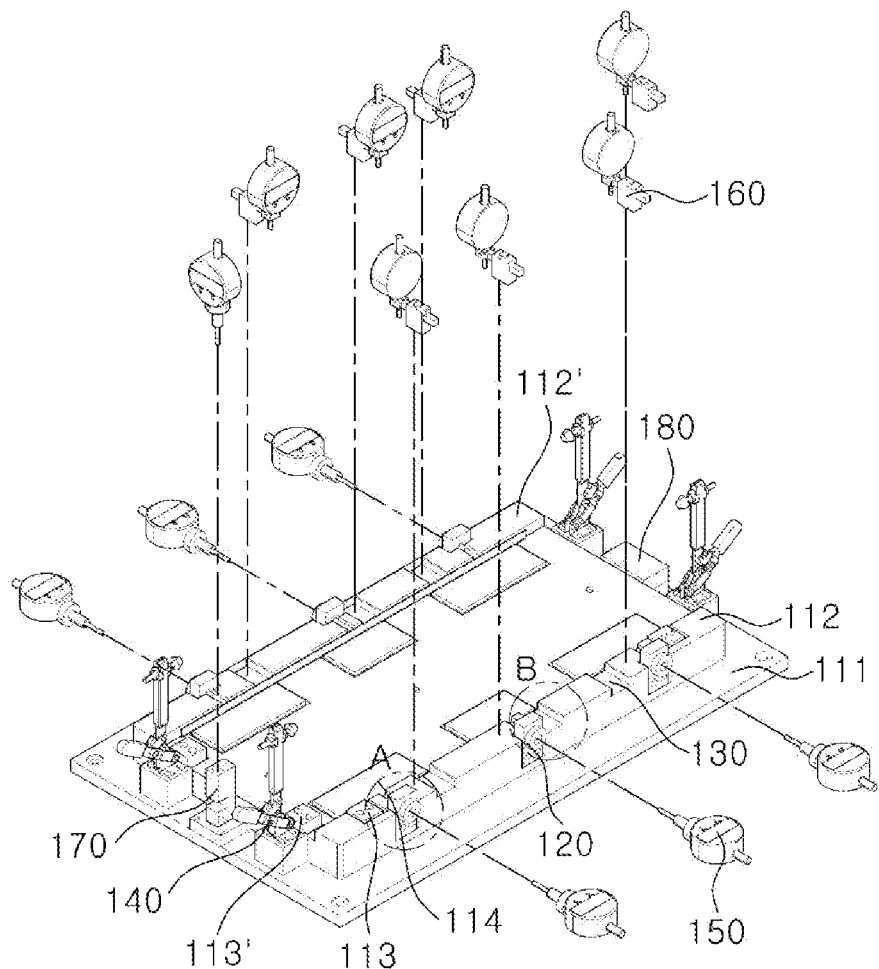

[FIG. 3]
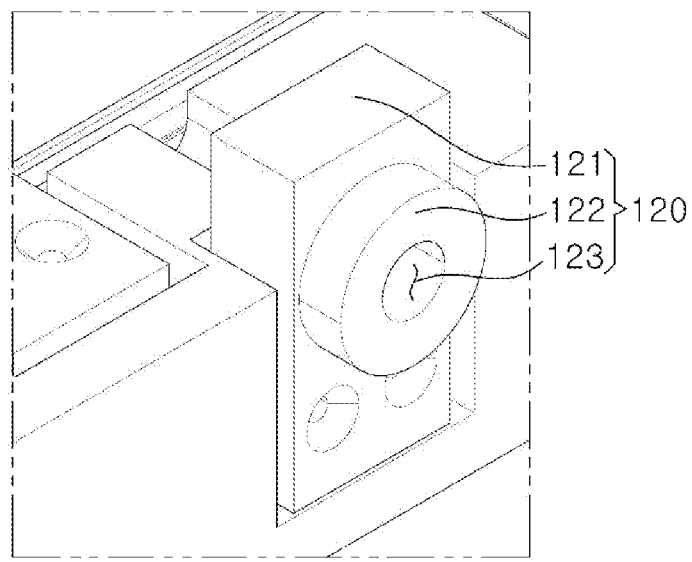
A
[FIG. 4]
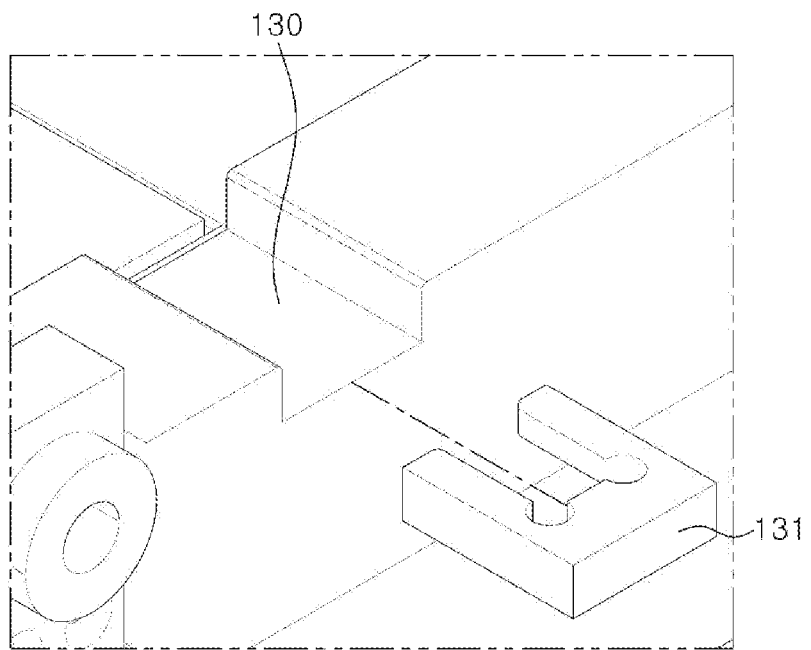
B

[FIG. 5]
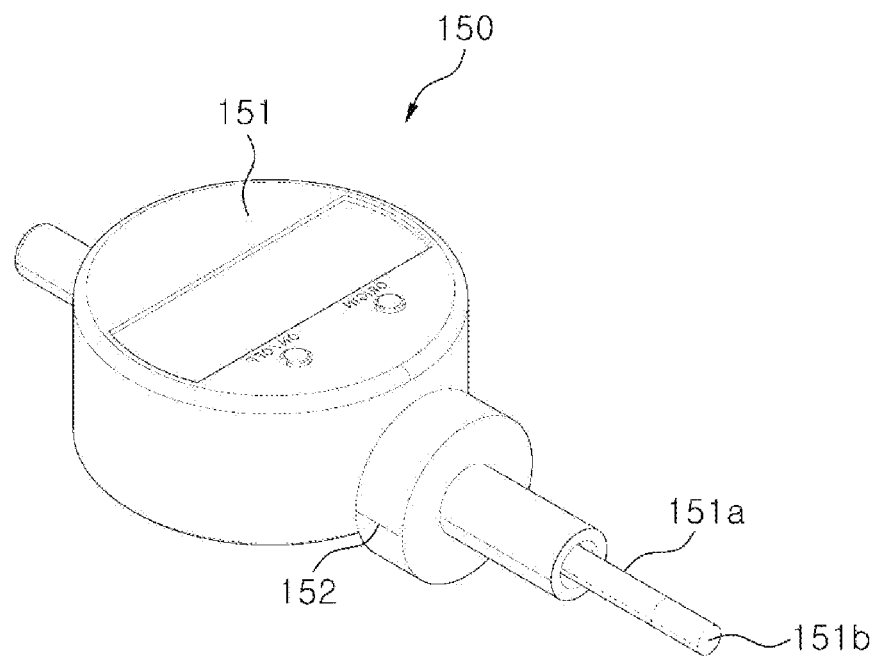

[FIG. 6]
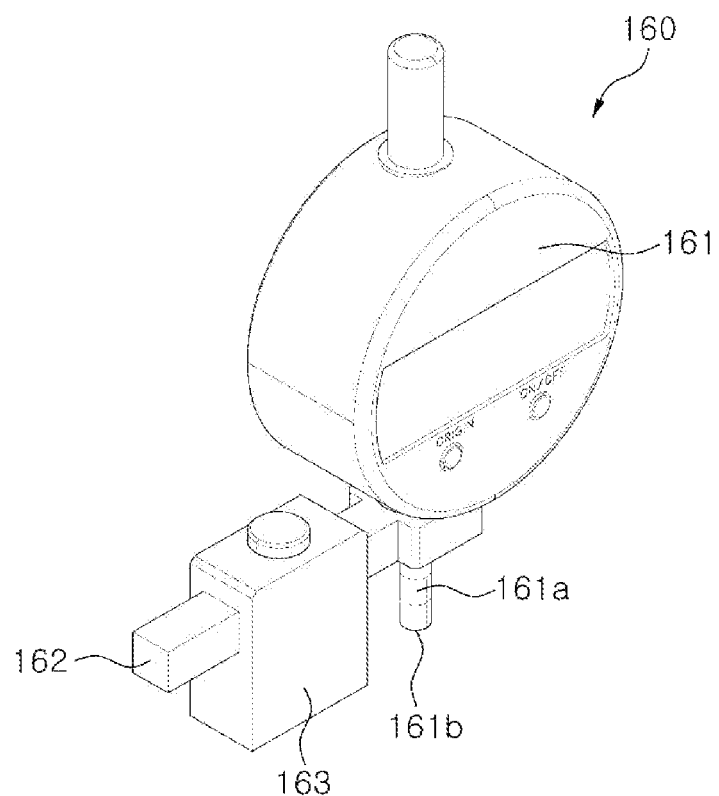

[FIG. 7]
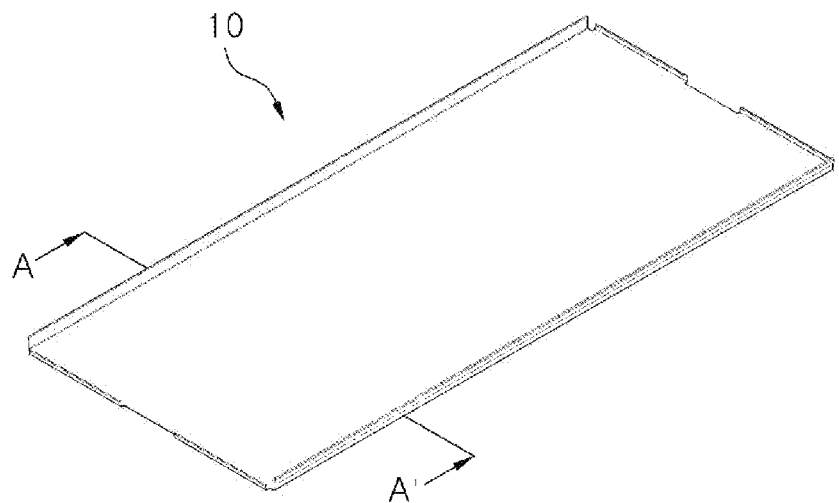
[FIG. 8]
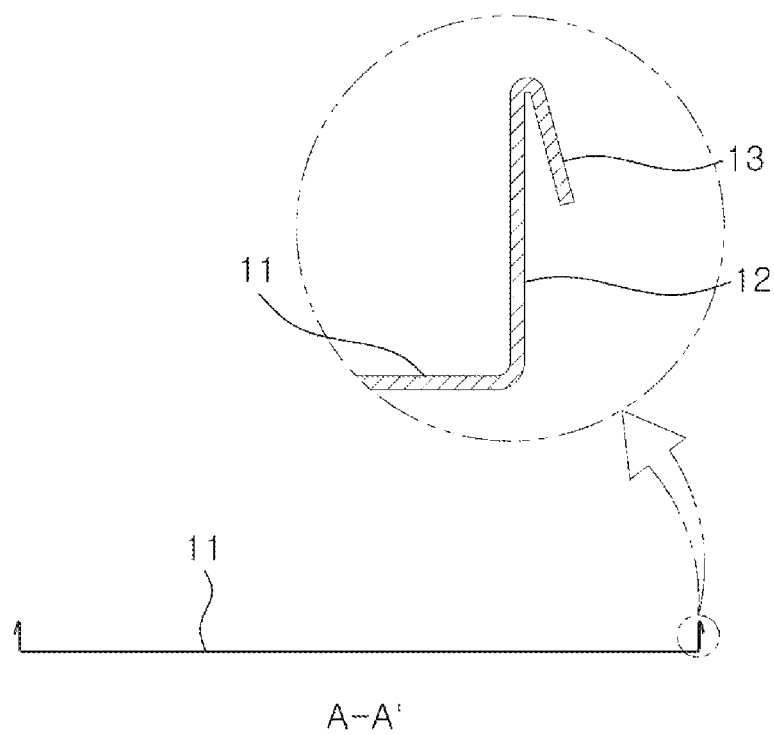
A-A'

[FIG. 9]
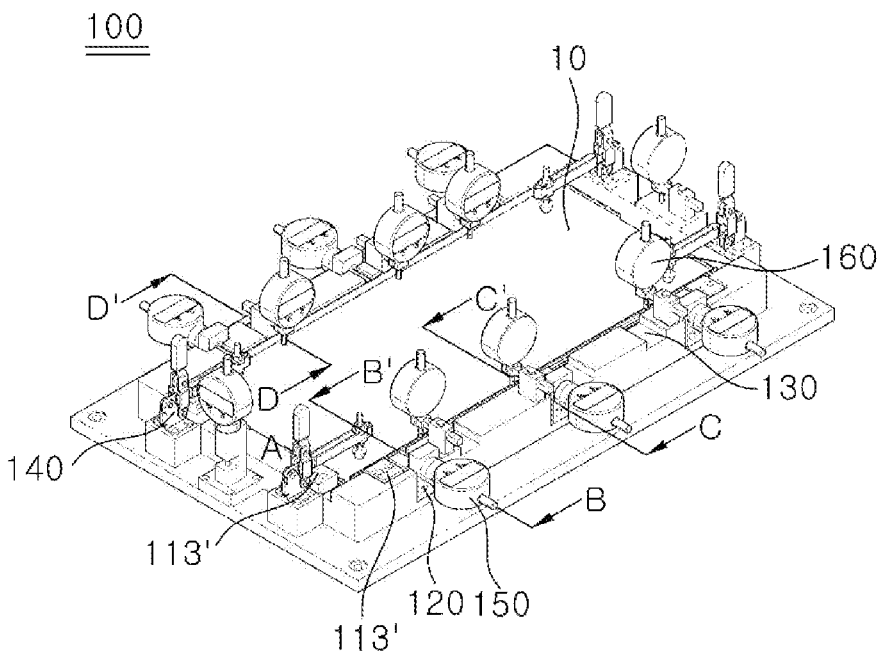

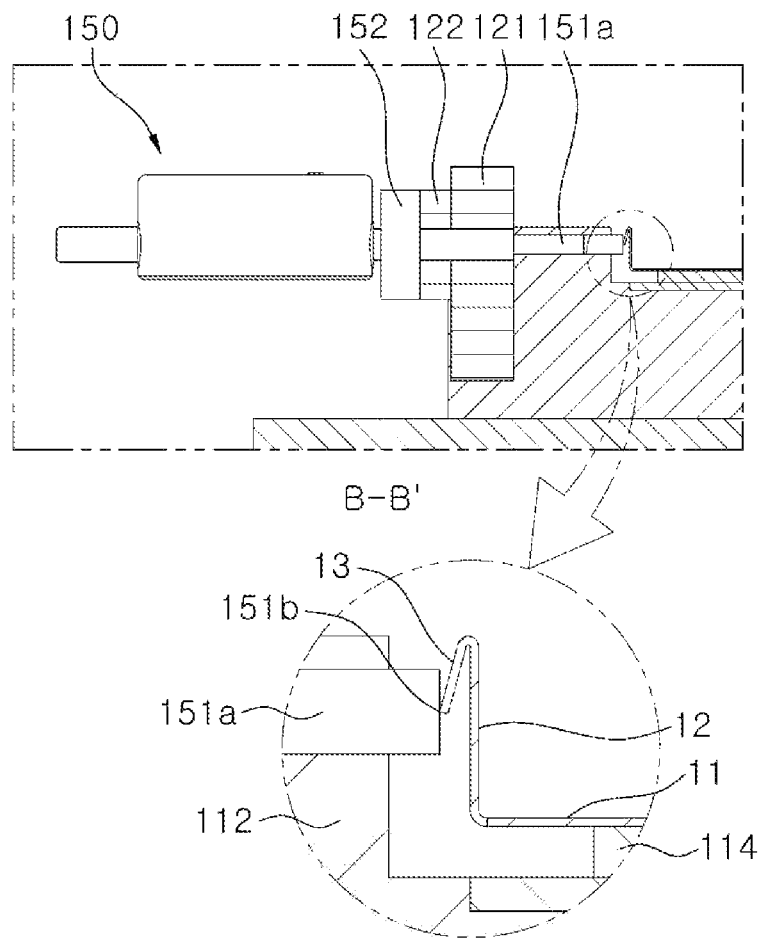
[FIG. 10]

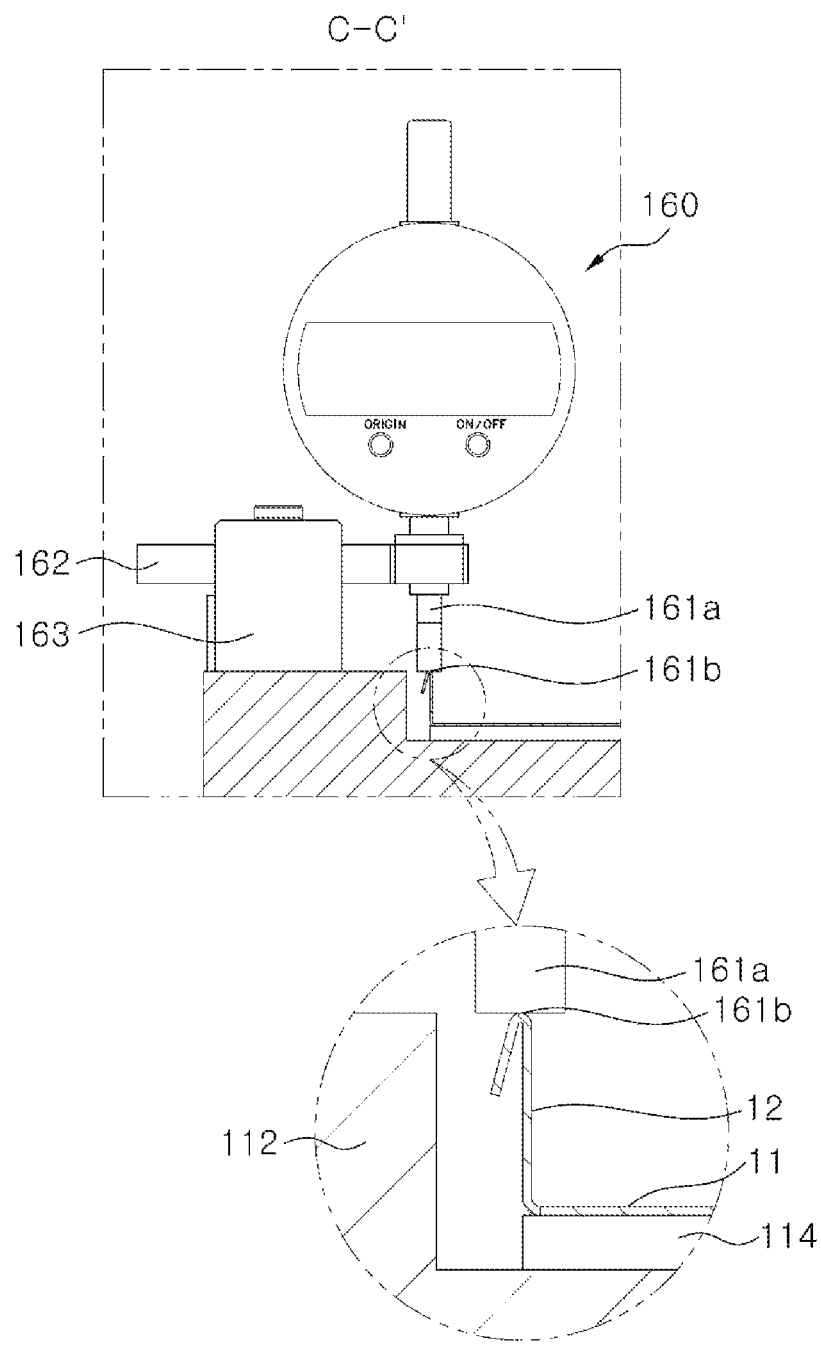
[FIG. 11]

[FIG. 12]
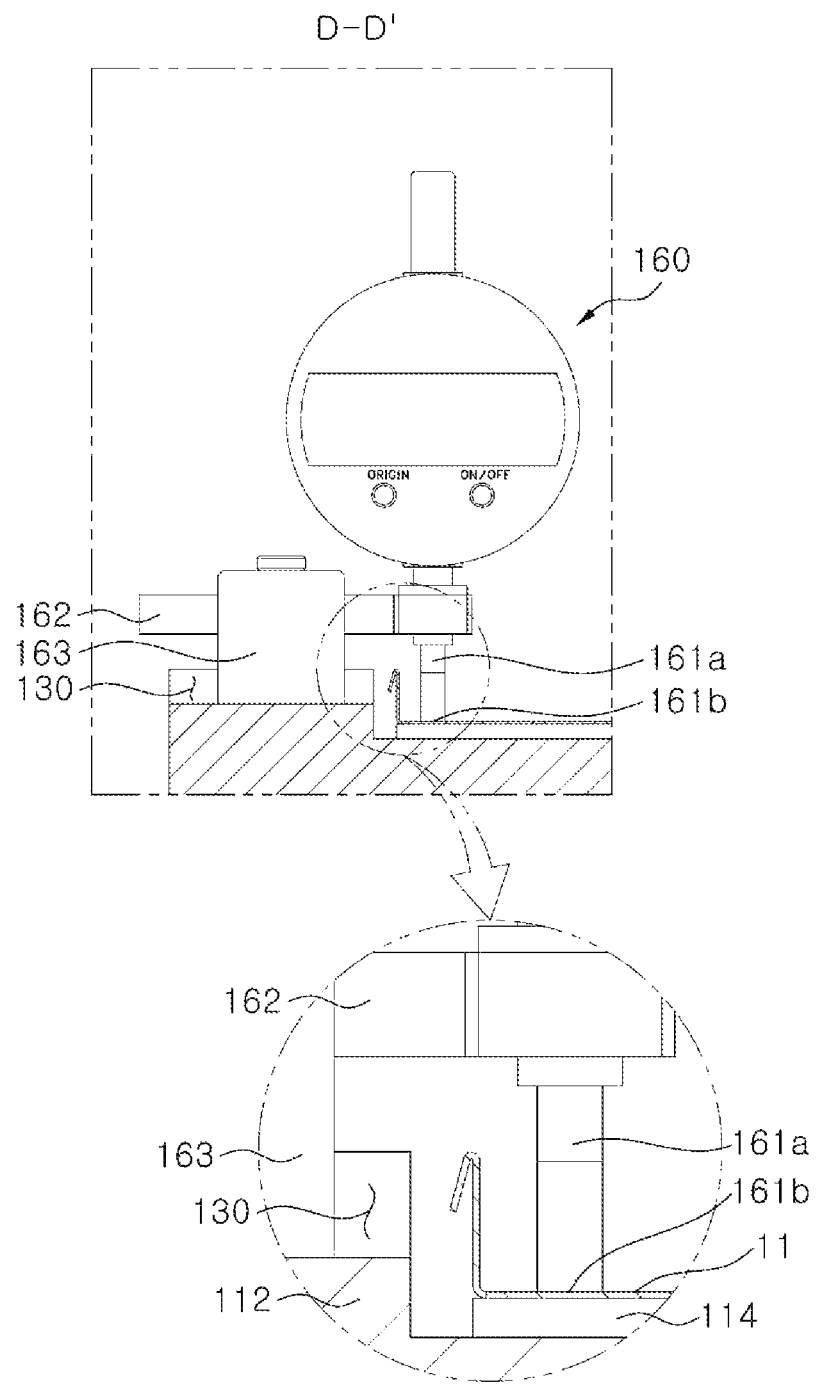

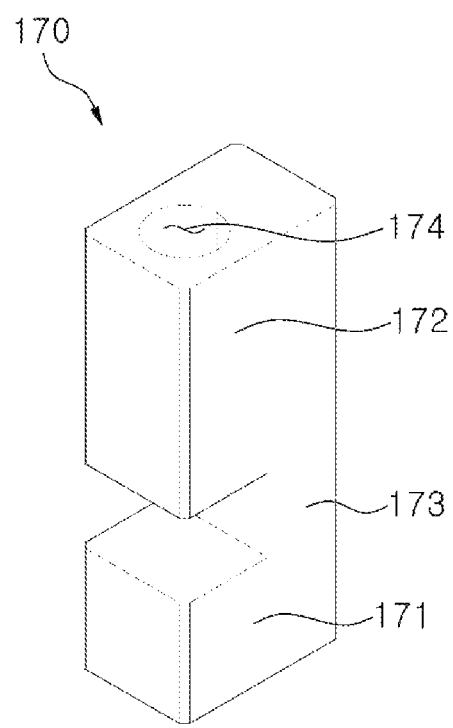
[FIG. 13]

INSPECTION DEVICE FOR COOLING PLATE

CROSS REFERENCE TO RELATED APPLICATION

The present application claims priority to Korean Patent Application No. 10-2022-0087439, filed Jul. 15, 2022, the entire contents of which is incorporated herein for all purposes by this reference.

BACKGROUND OF THE INVENTION

Field of the Invention

The present disclosure relates to an inspection device for a cooling plate.

Description of the Related Art

Recently, as interest and demand for electric vehicles have increased due to environmental problems related to global energy and global warming, the demand for batteries, a key component of electric vehicles, is also increasing.

Korean Patent No. 10-1986238 discloses an example of a cooling plate for battery heat exchange. The cooling plate, which is one of the core parts of a battery, functions to efficiently cool the battery through thermal management and maintain the battery in an optimal condition to prolong the life of the battery.

Yet, since a dedicated inspection device capable of inspecting whether or not the aforementioned cooling plate is defective is not provided, it is difficult to accurately inspect cooling plates and detect defective ones, which is problematic.

Documents of Related Art (Patent Document 0001) KR 10-1986238 B1 (May 30, 2019)

SUMMARY OF THE INVENTION

Accordingly, the present disclosure has been made keeping in mind the above problems occurring in the related art, and the present disclosure is intended to provide an inspection device for a cooling plate that accurately inspects cooling plates to reduce cooling plate defect rate.

In order to achieve the above objective, according to an embodiment of the present disclosure, there is provided an inspection device for a cooling plate including: an inspection table including: a base on which a cooling plate is seated; a support block located on each side of the cooling plate seated on the base in a width direction and provided along a length of the cooling plate; a guide block provided on the support block and in close contact with an end of the extension plate; and a plurality of height blocks provided on the base and supporting a lower surface of the base plate; a clamp provided on the base and pressing an upper surface of the base plate; a plurality of gauge jigs provided on the support block along a length of the support block; and a plurality of gauge grooves; a first measurement unit coupled to each of the gauge jigs to measure a distance at which the end of the extension plate is spaced from the bending plate; and a second measurement unit seated on the support block to measure a distance at which the end of the bending plate is spaced apart from the end of the base plate in the width direction, and is coupled to each of the gauge grooves to measure a flatness of the base plate.

In addition, the first measurement unit of the inspection device for a cooling plate according to the embodiment may include: a dial gauge including a spindle equipped with a measurer at an end thereof; and a stopper provided on an outer circumferential surface of the spindle, and the each of the gauge jigs may include: a first block portion provided in the support block; a second block portion provided on a side of the first block portion; and a horizontal hole portion formed through the first block portion and the second block portion in the width direction of the cooling plate so that the measurer comes into contact with the end of the extension plate.

In addition, the second measurement unit of the inspection device for a cooling plate according to the embodiment may include: a dial gauge including a spindle equipped with a measurer at an end thereof; a support bar provided on the spindle in a vertical direction of the spindle; and a pillar block configured to be movable along the support bar, and the each of the gauge grooves may be formed in a shape corresponding to a lower part of the pillar block.

In addition, the each of the height blocks of the inspection device for a cooling plate according to the embodiment may be located below a point where the cooling plate and the clamp come into contact and below a point where the cooling plate and the second measurement unit come into contact, so that the cooling plate may not be deformed.

In addition, the inspection device for a cooling plate according to the embodiment may further include: a zero point unit provided on the base and adjusting a zero point of the first measurement unit, wherein the zero point unit may include: a support portion provided on the base; a holding portion located above the support portion; a supporting portion provided on the support portion to support the holding portion; and a vertical hole portion formed through the holding portion in a height direction of the holding portion.

An inspection device for a cooling plate according to an embodiment of the present disclosure can inspect a cooling plate by using first and second measurement units at multiple measuring points. In this way, more precise inspection can be performed.

In addition, the inspection device for a cooling plate according to the embodiment of the present disclosure has a structure in which a measurer of the first measurement unit comes into contact with the end of an extension plate of the cooling plate when the first measurement unit is coupled to a gauge jig. Thus, the distance (gap between a bending plate and the extension plate) at which the end of the extension plate is separated from the bending plate of the cooling plate can be easily measured.

In addition, the inspection device for a cooling plate according to the embodiment of the present disclosure has a structure in which a measurer of the second measurement unit comes into contact with a base plate of the cooling plate when the second measurement unit is coupled to a gauge groove. Thus, the flatness of the base plate of the cooling plate can be easily measured.

In addition, the inspection device for a cooling plate according to the embodiment of the present disclosure has a structure in which the measurer of the second measurement unit contacts the end of the bending plate of the cooling plate when the second measurement unit is seated on a support block. Thus, the distance (step difference between the base plate and the bending plate) of the end of the bending plate from the end of the base plate in the width direction can be easily measured.

In addition, the inspection device for a cooling plate according to the embodiment of the present disclosure has a structure in which the first measurement unit is inserted into the gauge jig and the second measurement unit is seated in the gauge groove and the support block. Thus, it is easy to couple the first and second measurement units to an inspection table, and maintenance is easy.

In addition, in the inspection device for a cooling plate according to the embodiment of the present disclosure, a height block is provided below a point where the second measurement unit and the cooling plate come into contact. Thus, accurate inspection of the cooling plate is possible, and no damage occurs to the cooling plate during the inspection process.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a perspective view of an inspection device for a cooling plate according to an embodiment;

FIG. 2 is an exploded view of the inspection device for a cooling plate according to the embodiment;

FIG. 3 is an enlarged view of a gauge jig shown in FIG. 2;

FIG. 4 is an enlarged view of a gauge groove shown in FIG. 2;

FIG. 5 is a perspective view of a first measurement unit;

FIG. 6 is a perspective view of a second measurement unit;

FIG. 7 is a perspective view of a cooling plate;

FIG. 8 is a cross-sectional view taken along line A-A' of FIG. 7;

FIG. 9 is a perspective view of the inspection device for a cooling plate according to the embodiment in which the cooling plate is seated;

FIG. 10 is a cross-sectional view taken along line B-B' of FIG. 9;

FIG. 11 is a cross-sectional view taken along line C-C' of FIG. 9;

FIG. 12 is a cross-sectional view taken along line D-D' of FIG. 9; and

FIG. 13 is a perspective view of a zero point unit.

DETAILED DESCRIPTION OF THE INVENTION

Advantages and features of the present disclosure, and methods of achieving them, will become clear with reference to the detailed description of the following embodiments in conjunction with the accompanying drawings. However, the present disclosure is not limited to the embodiments disclosed below and may be implemented in a variety of different forms. The embodiments are only to provided to complete the present disclosure and to fully inform those skilled in the art of the scope of the invention to which the present disclosure pertains. The present disclosure is only defined by the scope of the claims. Like reference numbers designate like elements throughout the specification.

Before describing an inspection device for a cooling plate according to an embodiment (hereinafter referred to as "inspection device 100"), a cooling plate 10 seated on the inspection device 100 will be described first. Referring to FIG. 7, which is a perspective view of the cooling plate 10, and FIG. 8, which is a cross-sectional view taken along line A-A' of FIG. 7, the cooling plate 10 includes a base plate 11, a bending plate 12 and an extension plate 13.

The base plate 11 is a plate shape having a predetermined area.

The bending plate 12 has a narrow width and long plate shape, and is formed by bending each end of the base plate 11 in the width direction to one side.

The extension plate 13 has a narrow width and long plate shape, and is formed at each end of the bending plate 12. The extension plate 13 extends from the end of the bending plate 12 toward the other side and outward of the base plate 11.

Referring to FIG. 1, which is a perspective view of the inspection device 100, and FIG. 2, which is an exploded view of the inspection device 100, the inspection device 100 includes an inspection table 110, a gauge jig 120, a gauge groove 130, a clamp 140, a first measurement unit 150 and a second measurement unit 160.

The inspection table 110 includes a base 111, a support block 112, a guide block 113 and a height block 114.

The base 111 is a plate shape having a predetermined area, and the cooling plate 10 is seated thereon. To be specific, the cooling plate 10 is seated on the base 111 so that the other side of the base plate 11 on which the bending plate 12 is not formed, that is, the lower surface of the base plate 11 comes into contact with the base 111.

The support block 112 has a block shape with length longer than width. The support block 112 is located on each side of the cooling plate 10 seated on the base 111 in the width direction, and is provided along the length of the cooling plate 10.

The guide block 113 is provided on the support block 112, and comes into close contact with the end of the extension plate 13 of the cooling plate 10. The guide block 113 holds the position of the cooling plate 10, and serves as a stopper to limit the movement of the cooling plate 10 (to prevent the cooling plate 10 from approaching the support block 112 by a set distance or less).

An auxiliary guide block 113' may be additionally provided on one side of the cooling plate 10 seated on the base 111 in the longitudinal direction.

The cooling plate 10 may be positioned at the correct position on the base 111 by bringing the end of the extension plate 13 of the cooling plate 10 into close contact with the guide block 113 and by bringing one side of the cooling plate in the longitudinal direction into close contact with the auxiliary guide block 113'.

The height block 114 is provided on the base 111 and supports the lower surface of the base plate 11. A plurality of height blocks 114 may be provided, may have various shapes as needed, and may be provided in various positions. As an example, the plurality of height blocks 114 may be provided in the longitudinal direction of the support block 112 between the pair of support blocks 112 and 112' to support the lower surface of the base plate 11 of the cooling plate 10 seated on the base 111.

A plurality of gauge jigs 120 are provided in the support block 112 along the length of the support block 112.

Referring to FIG. 3, which is an enlarged view of the gauge jig 120 of FIG. 2, the gauge jig 120 includes a first block portion 121, a second block portion 122, and a horizontal hole portion 123.

The first block portion 121 is provided on the support block 112.

The second block portion 122 is provided on one side of the first block portion 121 and serves to support a spindle 151*a* of the first measurement unit 150 to be described later. In addition, the second block portion 122 serves to position the first measurement unit 150 in place by limiting the distance at which the spindle 151*a* of the first measurement unit 150 is inserted while being in close contact with a stopper 152 of the first measurement unit 150 to be described later.

Considering the direction in which the first measurement unit 150 is coupled, the second block portion 122 is preferably formed on one side of the first block portion 121 facing away from the bending plate 12 of the cooling plate 10.

The horizontal hole portion 123 is foiled through the first block portion 121 and the second block portion 122. It is preferable that the height at which the horizontal hole portion 123 is famed is such that a measurer 151*b* of the first measurement unit 150, which will be described later, may come into contact with the end of the extension plate 13.

A plurality of gauge grooves 130 are provided in the support block 112 along the length of the support block 112.

Referring to FIG. 4 which is an enlarged view of the gauge groove 130 of FIG. 2, the gauge groove 130 is formed perpendicularly to the support block 112 and is formed in a shape corresponding to the lower part of a pillar block 163 of the second measurement unit 160 to be described later.

The gauge groove 130 may further include a bracket 131. The bracket 131 is seated in the gauge groove 130 and serves to support the lower part of the pillar block 163 of the second measurement unit 160.

A plurality of clamps 140 are provided on the base 111, and function to fix the cooling plate 10 to the base 111 by pressing the upper surface of the base plate 11.

As long as the clamps 140 can perform a function of pressing and fixing the cooling plate 10, other configurations may be used. As an example, the clamps 140 may fix the cooling plate 10 to the base 111 using a pneumatic device or a hydraulic device.

The first measurement unit 150 is coupled to the gauge jig 120 and functions to measure the distance (gap between the bending plate 12 and the extension plate 13) at which the end of the extension plate 13 is separated from the bending plate 12. Referring to FIG. 5 which is a perspective view of the first measurement unit 150, the first measurement unit 150 includes a dial gauge 151 and the stopper 152.

The dial gauge 151 includes: the spindle 151*a*; and the measurer 151*b* provided at an end of the spindle 151*a*, and is composed of a dial gauge capable of measuring displacement. The dial gauge 151 may be configured as a digital gauge capable of measuring displacement.

The stopper 152 is provided on the outer circumferential surface of the spindle 151*a*, and comes into close contact with the second block portion 122 when the first measurement unit 150 is coupled to the gauge jig 120. The stopper 152 serves to position the first measurement unit 150 in place by adhering to the second block portion 122 to limit the distance at which the spindle 151*a* of the first measurement unit 150 is inserted into the horizontal hole portion 123 of the gauge jig 120.

The second measurement unit 160 is seated on the support block 112 to measure the distance (step difference between the base plate 11 and the bending plate 12) at which the end of the bending plate 12 is spaced apart from the end of the base plate 11 in the width direction, and is coupled to the gauge groove 130 to measure the flatness of the base plate 11.

Referring to FIG. 6, which is a perspective view of the second measurement unit 160, the second measurement unit 160 includes a dial gauge 161, a support bar 162, and the pillar block 163.

The dial gauge 161 includes: a spindle 161*a*; and a measurer 161*b* provided at an end of the spindle 161*a*, and is composed of a dial gauge capable of measuring displacement. The dial gauge 161 may be configured as a digital gauge capable of measuring displacement.

The support bar 162 has a shape with length longer than width, and is provided on the spindle 161*a* of the second measurement unit 160 in the vertical direction of the spindle 161*a* of the second measurement unit 160.

The pillar block 163 has a flat bottom surface and is configured to be movable along the support bar 162. The lower part of the pillar block 163 is coupled to the gauge groove 130.

In addition, the inspection device 100 may further include a computer (not shown) that receives measured values from the first measurement unit 150 and the second measurement unit 160, organizes the received measured values, judges the inspection result of the cooling plate 10, and visually displays the judgment result.

Referring to FIG. 9, which is a perspective view of the inspection device 100 on which the cooling plate 10 is seated, the cooling plate 10 is seated on the base 111 so that the lower surface of the base plate 11 comes into contact with the base 111. Then, after the end of the extension plate 13 of the cooling plate 10 is brought into close contact with the guide block 113, the cooling plate 10 is fixed to the base 111 using the clamps 140. At this time, the cooling plate 10 is spaced apart from the base 111 by a predetermined distance by the height block 114.

Referring to FIG. 10, which is a cross-sectional view taken along line B-B' of FIG. 9, a method of measuring the distance (gap between the bending plate 12 and the extension plate 13) at which the end of the extension plate 13 is spaced from the bending plate 12 by using the first measurement unit 150 will be described.

The spindle 151*a* of the first measurement unit 150 is inserted into the horizontal hole portion 123 of the gauge jig 120. To be specific, since the horizontal hole portion 123 is formed through the cooling plate 10 in the width direction, the spindle 151*a* of the first measurement unit 150 is inserted into the horizontal hole portion 123 of the gauge jig 120 in the width direction of the cooling plate 10.

The inserted spindle 151*a* of the first measurement unit 150 is supported by the first block portion 121 and the second block portion 122, and as the stopper 152 adheres to the second block portion 122, the distance at which the spindle 151*a* of the first measurement unit 150 is inserted into the horizontal hole portion 123 is limited, so that the first measurement unit 150 is positioned at a proper position for measuring the distance at which the end of the extension plate 13 is separated from the bending plate 12.

Subsequently, as the measurer 151*b* of the first measurement unit 150 coupled to the gauge jig 120 comes into contact with the end of the extension plate 13, the distance at which the end of the extension plate 13 is separated from the bending plate 12 is measured.

Referring to FIG. 11, which is a cross-sectional view taken along line C-C' of FIG. 9, a method of measuring the flatness of the base plate 11 by using the second measurement unit 160 will be described.

The pillar block 163 of the second measurement unit 160 is coupled to the gauge groove 130. By the gauge groove 130, the second measurement unit 160 is positioned at a proper position for measuring the flatness of the base plate 11.

Subsequently, the measurer 161b of the second measurement unit 160 coupled to the gauge groove 130 contacts the upper surface of the base plate 11 to measure the flatness of the base plate 11. If the values measured by the second measurement units 160 coupled to the individual gauge grooves 130 are different, it can be seen that the upper surface of the base plate 11 is not flat.

By locating the height block 114 below the point where the base plate 11 of the cooling plate 10 and the measurer 161b of the second measurement unit 160 come into contact, more precise measurement is possible without damaging the cooling plate 10.

Referring to FIG. 12, which is a cross-sectional view taken along line D-D' of FIG. 9, a method of measuring, by using the second measurement unit 160, the distance (step difference between the base plate 11 and the bending plate 12) at which the end of the bending plate 12 is spaced apart from the end of the base plate 11 in the width direction will be described.

The pillar block 163 of the second measurement unit 160 is seated on the support block 112. To be specific, the pillar block 163 of the second measurement unit 160 is seated on the support block 112 so that the measurer 161b of the second measurement unit 160 comes into contact with the end of the bending plate 12.

Subsequently, the measurer 161b of the second measurement unit 160 contacts the end of the bending plate 12 to measure the distance at which the end of the bending plate 12 is separated from the end of the base plate 11 in the width direction.

By locating the height block 114 below the point where the bending plate 12 of the cooling plate 10 and the measurer 161b of the second measurement unit 160 come into contact, more precise measurement is possible without damaging the cooling plate 10.

In addition, the inspection device 100 may further include a zero point unit 170.

Referring to FIG. 13, which is a perspective view of the zero point unit 170, the zero point unit 170 functions to adjust the zero point of the first measurement unit 150, and includes a support portion 171, a holding portion 172, a supporting portion 173, and a vertical hole portion 174.

The support portion 171 has a block shape with a flat upper surface, and is provided on the base 111.

The holding portion 172 has a block shape with a flat upper surface, and is located above the support portion 171.

The supporting portion 173 is provided on the upper surface of the support portion 171 to support the holding portion 172.

The vertical hole portion 174 is formed through the holding portion 172 in the height direction of the holding portion 172. The vertical hole portion 174 preferably has a larger diameter than the diameter of the spindle 151a of the first measurement unit 150.

The zero point of the first measurement unit 150 may be set by equally configuring the distance from the upper surface of the holding portion 172 to the upper surface of the support portion 171, and the distance from one side of the second block portion 122 in contact with the stopper 152 of the first measurement unit 150 to the end of the extension plate 13 of the cooling plate 10 seated on the base 111.

In addition, the inspection device 100 may further include an auxiliary zero point unit 180.

The auxiliary zero point unit 180 has a flat upper surface. The zero point of the second measurement unit 160 may be set by configuring the measurer 161b of the second measurement unit 160 to contact the upper surface of the auxiliary zero point unit 180 after the pillar block 163 of the second measurement unit 160 is seated on the upper surface of the auxiliary zero point unit 180.

The above-described inspection device 100 may inspect the cooling plate 10 using the first or second measurement units 150 and 160 at a plurality of measurement points. In this way, more precise inspection may be performed.

In addition, the above-described inspection device 100 has a structure in which the measurer 151b of the first measurement unit 150 comes into contact with the end of an extension plate 13 of the cooling plate 10 when the first measurement unit 150 is coupled to the gauge jig 120. Thus, the distance (gap between the bending plate 12 and the extension plate 13) at which the end of the extension plate 13 is separated from the bending plate 12 of the cooling plate 10 may be easily measured.

In addition, the above-described inspection device 100 has a structure in which the measurer 161b of the second measurement unit 160 comes into contact with the base plate 11 of the cooling plate 10 when the second measurement unit 160 is coupled to the gauge groove 130. Thus, the flatness of the base plate 11 of the cooling plate 10 may be easily measured.

In addition, the above-described inspection device 100 has a structure in which the measurer 161b of the second measurement unit 160 contacts the end of the bending plate 12 of the cooling plate 10 when the second measurement unit 160 is seated on the support block 112. Thus, the distance (step difference between the base plate 11 and the bending plate 12) of the end of the bending plate 12 from the end of the base plate 11 in the width direction may be easily measured.

In addition, in the above-described inspection device 100, the height block 114 is provided below a point where the second measurement unit 160 and the cooling plate 10 come into contact. Thus, accurate inspection of the cooling plate 10 is possible, and no damage occurs to the cooling plate 10 during the inspection process.

In addition, the above-described inspection device 100 has a structure in which the first measurement unit 150 is inserted into the gauge jig 120 and the second measurement unit 160 is seated in the gauge groove 130 and the support block 112. Thus, it is easy to couple the first and second measurement units 150 and 160 to an inspection table, and maintenance is easy.

Expressions (terms, visualized images, etc.) used in describing the embodiments of the present disclosure are merely selected for instrumental purposes to enhance understanding of the technology.

In addition, for circumstances, the present disclosure has been described by a limited number of embodiments, and those skilled in the art will be able to devise new embodiments based on the described embodiments without departing from the technical spirit of the present disclosure.

Therefore, the claims of the present disclosure should not be limited by some expressions shown in the "Description of the Invention" and "Drawings", should be interpreted broadly on the basis of the original technical spirit inherent throughout the specification.

What is claimed is:

1. An inspection device for a cooling plate having a base plate, a bending plate bent to a first side at each end of the base plate in a width direction, and an extension plate extending from an end of the bending plate toward a second side and outward of the base plate, the inspection device comprising:
an inspection table comprising:
a base on which the cooling plate is seated;
a support block located on each side of the cooling plate seated on the base in the width direction and provided along a length of the cooling plate;
a guide block provided on the support block and in close contact with an end of the extension plate; and
a plurality of height blocks provided on the base and supporting a lower surface of the base plate;
a clamp provided on the base and pressing an upper surface of the base plate;
a plurality of gauge jigs provided on the support block along a length of the support block; and a plurality of gauge grooves;
a first measurement unit coupled to each of the gauge jigs to measure a distance at which the end of the extension plate is spaced from the bending plate; and
a second measurement unit seated on the support block to measure a distance at which the end of the bending plate is spaced apart from the end of the base plate in the width direction, and is coupled to each of the gauge grooves to measure a flatness of the base plate.

2. The inspection device of claim 1, wherein the first measurement unit comprises:
a dial gauge including a spindle equipped with a measurer at an end thereof; and
a stopper provided on an outer circumferential surface of the spindle, and
the each of the gauge jigs comprises:
a first block portion provided in the support block;
a second block portion provided on a side of the first block portion; and
a horizontal hole portion formed through the first block portion and the second block portion in the width direction of the cooling plate so that the measurer comes into contact with the end of the extension plate.

3. The inspection device of claim 1, wherein the second measurement unit comprises:
a dial gauge including a spindle equipped with a measurer at an end thereof;
a support bar provided on the spindle in a vertical direction of the spindle; and
a pillar block configured to be movable along the support bar, and
the each of the gauge grooves is formed in a shape corresponding to a lower part of the pillar block.

4. The inspection device of claim 1, wherein each of the height blocks is located below a point where the cooling plate and the clamp come into contact and below a point where the cooling plate and the second measurement unit come into contact, so that the cooling plate is not deformed.

5. The inspection device of claim 2, further comprising:
a zero point unit provided on the base and adjusting a zero point of the first measurement unit,
wherein the zero point unit comprises:
a support portion provided on the base;
a holding portion located above the support portion;
a supporting portion provided on the support portion to support the holding portion; and
a vertical hole portion formed through the holding portion in a height direction of the holding portion.

* * * * *